July 4, 1967  F. O'CONOR  3,329,275
CENTRIFUGALS

Filed Nov. 20, 1964

INVENTOR
FRANK O'CONOR
BY
Robertson Smythe & Bryan
ATTORNEYS

July 4, 1967 F. O'CONOR 3,329,275
CENTRIFUGALS
Filed Nov. 20, 1964 2 Sheets-Sheet 2
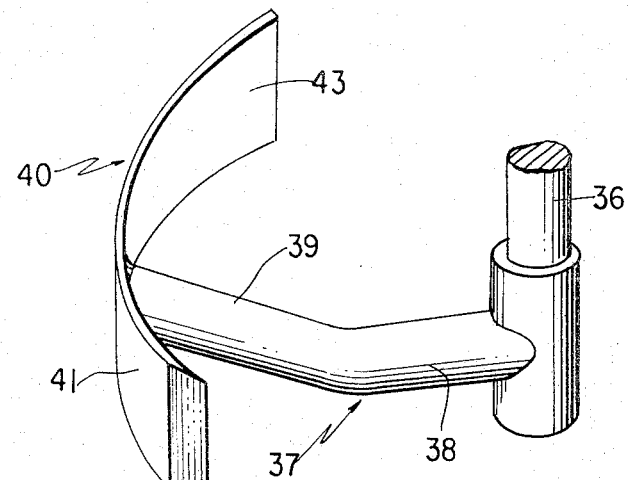
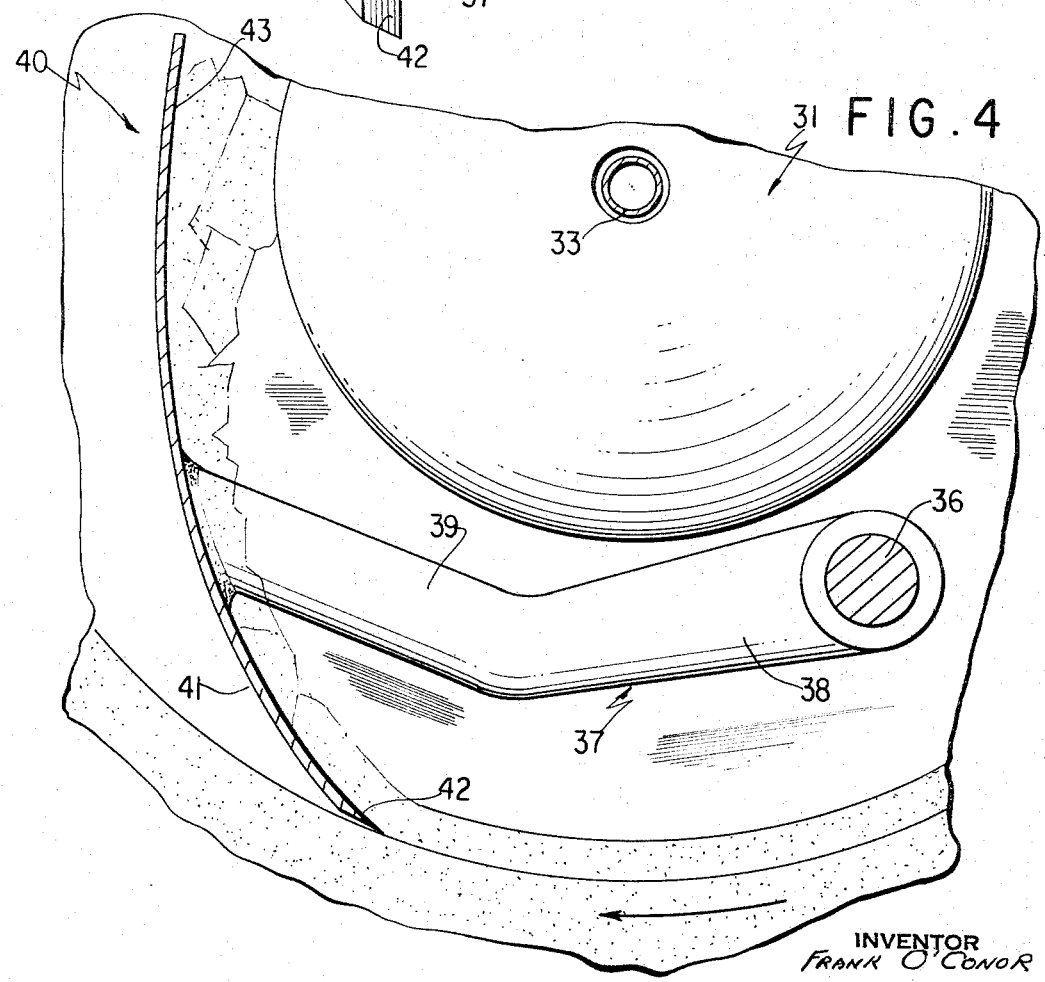
INVENTOR
FRANK O'CONOR
BY
Robertson Bryant
ATTORNEYS

United States Patent Office 3,329,275
Patented July 4, 1967

3,329,275
CENTRIFUGALS
Frank O'Conor, Moline, Ill., assignor to Ametek, Inc.,
New York, N.Y., a corporation of Delaware
Filed Nov. 20, 1964, Ser. No. 412,801
1 Claim. (Cl. 210—375)

This invention relates to centrifugal separators and particularly to an improved plow mechanism for a centrifugal separator for removing cake from the interior wall of the separator basket.

Space limitations within centrifugal separators have required the design of prior known plows to be relatively short and to swing on a rather sharp radius in order to fit between the basket ring opening and the basket hub or feed cone of the separator. Such prior known constructions were not too satisfactory because the plow action was more of a scraping than a shearing action. Furthermore, when plowing at an elevation above the feed cone, prior known plows had a tendency to discharge removed solids against the feed cone where they might lodge instead of dropping through the solids discharge opening in the bottom of the basket.

The principal object of the present invention is to provide a plow mechanism that will avoid the above as well as other difficulties encountered with prior known plow constructions.

Another object of the invention is to provide such a plow construction that will have the capability of turning about a relatively large radius.

Still another object of the invention is to provide such a plow mechanism that will approach the cake more nearly tangential to the inner periphery of the centrifugal basket than prior known plows.

Another object of the invention is to provide such a plow mechanism that includes an elongated, curved blade that curves around the feed cone when in its upper position.

In one aspect of the invention, a centrifugal separator may comprise a base having three uprights spaced 120°, which uprights support a housing or shell for limited oscillatory movement. The shell may include a central discharge opening surrounded by a wall spaced inwardly from the shell forming an annular chamber for collecting the liquid centrifuged from a basket that is mounted within the shell for rotation about a vertical axis. The basket may be provided with a perforated or imperforate outer wall and a somewhat conical inner wall, the apex of the latter being fixed to a vertical, centrally disposed spindle that may be driven by belt gearing or otherwise extending between a pulley on the bottom end of the spindle and one on the output shaft of a motor mounted on the exterior of the shell or otherwise.

A conical slurry feeding member may be attached to the upper end of the conical inner wall of the basket, such that a conical annular space exists between the two. A slurry feeding tube may extend downwardly into the upper open end of the conical member for feeding slurry into said annular conical space, which latter during basket rotation throws the slurry outwardly against the inner surface of the outer wall of the basket.

In another aspect of the invention, a vertically extending, axially movable and rotatable shaft may extend into the basket. It may be offset from the outer periphery of the conical feeding member and may have fixed to it an arm that includes a substantial portion thereof deflected from the radial and toward the spindle of the rotatable basket.

In still another aspect of the invention, an elongated, curved blade may be attached to the deflected arm such that its cutting edge is behind the shaft supporting the arm relative to the direction of basket rotation. The curved blade may have a radius substantially equal to that of the basket and curved so as to wrap around the spindle of the basket. The construction is such that as the plow is turned counterclockwise about the axis of its supporting shaft, its cutting edge approaches the inner wall of the basket in a manner to shear off the accumulation of cake rather than to scrape it off, and substantially solely under the power applied to the shaft supporting the arm so that substantially no overloading action of the plow occurs. When turned clockwise, the curved blade curves around the feed cone when in its elevated position.

The above, other objects and novel features of the improved plow mechanism for centrifugal separators will become apparent from the following specification and accompanying drawings which are merely exemplary.

In the drawings:

FIG. 3 is a perspective view of the plow per se; and

FIG. 4 is an enlarged view of part of the structure shown in FIG. 2.

Figure 1:
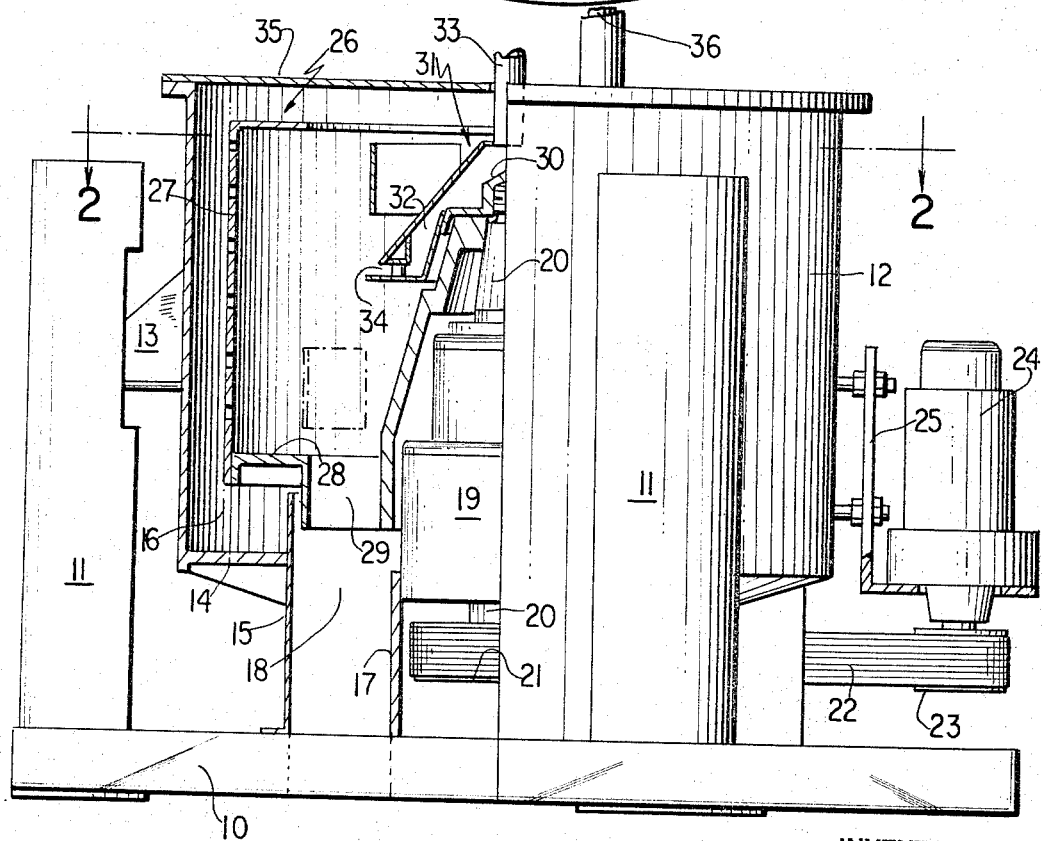
FIG. 1 is an elevational view, partly in section, of a centrifugal separator to which the principles of the invention have been applied.

Referring to the drawings, and particularly to FIG. 1, the principles of the invention are shown as applied to a centrifugal separator including a base 10 on which three standards 11 (only two being shown) are mounted at 120° intervals.

A shell or housing 12 includes brackets 13 attached to its periphery which extend into standards 11 and which are connected to means within said standards for supporting the shell 12 for limited oscillatory movement. The shell 12 may include a bottom wall 14 that supports a tubular skirt 15 that is concentric with shell 12 and extends above and below bottom wall 14, forming a chamber 16 within which effluent is collected.

Another tubular wall 17 is mounted on base 10 and it forms an annular passage 18 through which filter cake gravitates as will be explained later. Wall 17 supports a bearing 19 which journals a vertical spindle 20 having a V-groove pulley 21 fixed to its lower end, which pulley is connected by belt means 22 to a pulley 23 on the output shaft of a motor 24. The motor 24 may be mounted on a bracket 25 attached to shell 12 or may be supported by any other suitable means.

A basket 26 may comprise an outer perforated wall 27 extending upwardly from a bottom wall 28, which latter includes passages 29 therethrough that lead to passage 18. Basket 26 may include an inner imperforate wall, the upper end of which is connected to spindle 20 by a nut 30. Nut 30 may support a conical feeding member 31 that forms an annular conical passage 32 and is open at its top to receive a slurry feeding pipe 33. As the basket is rotated and slurry is fed through pipe 33, it is slung outwardly through passage 34 to the perforated wall 27.

Figure 2:
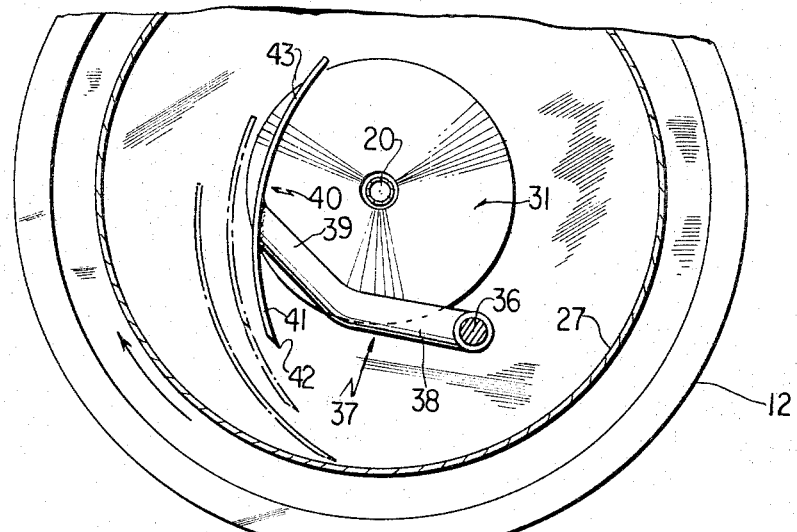
FIG. 2 is a sectional view taken substantially along line 2—2 of FIG. 1.

Shell 12 is covered by a removable plate 35 through which an axially movable, rotatable shaft 36 extends in offset relation to the cone 31. Referring to FIG. 2, shaft 36 has fixed to it an arm 37 that includes a radial portion 38 and a portion 39 that is deflected from the radial toward the spindle 20. At the end of portion 39, an elongated curved blade 40 is attached. It includes a portion 41 having a shearing edge 42 thereon, and a rear portion 43 of such length that as cake slides off of it, the cake will not strike the feed cone 31.

The curvature of the blade 40 has a radius substantially the same as that of wall 27 of basket 26. The arrangement is such that as the blade 40 is turned in a counterclockwise direction, edge 42 approaches the inner surface of wall 27 more nearly tangentially than radially.

When the arm 37 is turned in a clockwise direction, blade 40 moves in toward spindle 20, and the elongated blade 40 curves around feed cone 31. The length of blade 40 and its curvature tend to prevent the removed filter cake from striking the feed cone 31 as it slides off the trailing end of blade 40.

With the curved blade 40 behind the shaft 36 relative to the direction of basket rotation, blade 40 must be forced into the solids by the power applied to shaft 36. If the blade 40 were in front of shaft 36 relative to the direction of basket rotation, the solids being plowed would act to force the blade toward the basket side sheet. This overhauling action is difficult to control because of the power and inertia of the rotating basket. Under such conditions the blade could rapidly be forced against the basket side wall, damaging filter cloth or screens, stalling the basket and even causing the breakage of parts.

Although the various features of the improved plow mechanism have been shown and described in detail to fully disclose one embodiment of the invention, it will be evident that changes may be made in such details and certain features may be used without others without departing from the principles of the invention.

What is claimed is:

In a centrifugal separator including a shell having a basket mounted on a substantially vertical spindle therein for rotation about a substantially vertical axis, and including a feed cone mounted along the axis of rotation of said basket, the combination with said basket of an axially movable and rotatable shaft being offset from the periphery of said cone, an arm fixed to said shaft extending first in a radial direction therefrom and thence in a direction curvingly deflected inwardly toward said spindle; and an elongated curvilinear blade attached to the outer end of the deflected portion of said arm, said blade having a radius of curvature substantially equal to that of said basket, whereby when said arm is moved to bring the leading edge of said blade toward the wall of said basket, it approaches said wall at substantially a tangent and thereby shearingly removes filter cake deposited thereon, said blade being movable from an operative scraping position adjacent said wall to an inoperative position spaced inwardly from said wall, said blade and arm being so constructed and arranged whereby when said blade is in its inoperative position said blade and arm overlie said cone and portions of said blade and arm lie within the periphery of said cone in surrounding relation thereto.

References Cited
UNITED STATES PATENTS

| | | | |
|---|---|---|---|
| 2,077,053 | 4/1937 | Neuman | 210—375 X |
| 2,279,235 | 4/1942 | Hertrich | 210—375 X |
| 2,467,023 | 4/1949 | Foster et al. | 210—375 |
| 2,755,991 | 7/1956 | Thol et al. | 210—375 X |
| 3,038,611 | 6/1962 | O'Conor et al. | 210—376 X |

REUBEN FRIEDMAN, *Primary Examiner.*

J. DE CESARE, *Assistant Examiner.*